Patented Aug. 7, 1934

1,968,916

UNITED STATES PATENT OFFICE 1,968,916

FOOD PRODUCT

Sam Siegel, New York, N. Y.

No Drawing. Application April 7, 1933, Serial No. 664,887

3 Claims. (Cl. 99—10)

This invention relates to improvements in dough mixtures in general, and particularly to a new kind of dough mixture intended for the production of bakery products.

One of the objects of this invention is to provide a wholesome, palatable dough mixture of a low carbohydrate percentage and of low calorific value, which mixture, when baked, will constitute a bakery product suitable for use in connection with any other solid or liquid food, in combination with which ordinary bread is consumed.

Another object of my invention is to produce a dough mixture intended for baking, in which, instead of pure water, an extract of celery is employed for preparing the batter.

Another object of my invention is to produce a baked product having as its major constituent, flour and a celery extract.

A still further object of my invention is a process, whereby a dough, intended for baking, and possessing a low carbohydrate percentage and a low calorific value is produced and subsequently baked to a loaf, in which the aforesaid properties will be uniform throughout the finished product.

Still another object of my invention is to so divide a loaf, produced by the aforesaid process, that each part represents a certain dosage, containing a definite amount of the ingredients from which the product is compounded.

Another object of my invention is to produce a palatable, wholesome loaf of bread of the usual size and the usual specific weight of ordinary bread, by the use of a considerably smaller percentage of flour than is commonly employed in the production of heretofore baked wheat or whole wheat bread loafs.

The foregoing and still further objects will become more readily apparent from the following descriptions of my invention, in which not only the composition matter, but also the manner or process by means of which the different ingredients are compounded are explained.

During the process of experimenting with the production of different kinds of bread, I have found that certain ingredients, known to be employed by different bakers in the dough mixture, possess detrimental or objectionable properties both as to health building and taste, while at the same time the finished bread often becomes heavy and soggy and cannot be readily digested, particularly by people not enjoying their full share of health.

The present invention deals with a new dough composition, from which any kind of bakery products may be produced, among which the most prominent is that of bread. My composition and the process of compounding it, eliminates most of the disadvantageous features of ordinary bread, while at the same time producing a wholesome, highly nutritious, easily digestible, but non-fattening product, which possesses a high vitamin and a very low calorific value. One of the outstanding features in my composition is the employment of a celery extract in the preparation of the dough mixture, instead of the usually employed ordinary water. In order to obtain the proper richness of my celery extract, I employ stalks and the hearts of the celery plant, both of which are cut into small pieces and boiled in a certain quantity of water, until about one third of the original water quantity is evaporated. Thereafter, the coarse parts of the cellulose residue of the celery are removed and squeezed out, thereby leaving a fine fibrous residue of celery particles in the thus saturated extract. This extract is then employed for preparing the dough. The fact that a very large percentage of undigested, finely distributed fibrous residue is retained in and forms a large portion of the extract, the latter virtually constitutes a semi-liquid product or mash in which the celery substance and particularly the fibrous celery "roughage" is held in suspension. This fact is of paramount importance to the consistency of the dough mixture both prior to baking it, inasmuch as the dough "swells" more readily, as well as to the finished product, in that the fibrous "roughage" replaces in the finished product a considerable amount of otherwise essential "roughage" of the flour, in order to produce a finished bread of the desired volume, consistency and weight. Consequently, a far lesser amount of flour is required in the manufacture of this bread, and the "roughages" of the "extract" and the flour blend and produce together the essential qualities intended for the bread.

The best result of producing the aforesaid celery extract in the desired concentration I have obtained by adhering to the following proportions:

With each two pounds of celery are mixed three quarts of water, the mixture is boiled until one quart of water is completely evaporated, thereby leaving two quarts of water compounded with the residue of celery. To the aforesaid celery extract I preferably add during boiling a dash of black pepper. Tests conducted with the celery extract disclose, that after total evaporation of water the residue contains 1% vegetable protein, 3% carbohydrates and 96% ash, mineral salts and vegetable fiber, which latter serves as substitute for a considerable amount of flour employed in my dough mixture.

In preparing my dough mixture, I may employ any kind of flour, but I prefer the use of whole wheat flour. The best suitable composition I have found to contain, besides whole wheat flour and the above described celery extract, a neutral, preferably mineral fat or oil of low fat value, salt and yeast. Another mixture consists of the aforesaid ingredients with a small amount of animal albumin in the form of whole egg.

As an example of the preferred proportions of my ingredients, I shall mention the following:

11 ounces of whole wheat flour, ½ ounce of mineral oil, ¼ ounce of table salt, ¼ ounce of baker's yeast and 8 ounces of celery extract of the properties stated above, and in which a dash of pepper is one of the ingredients.

The above mixture may be altered as follows:
10 ounces of whole wheat flour, 1 whole egg, 7½ to 8 ounces of celery extract, ½ ounce of mineral oil, ¼ ounce of table salt, and ¼ ounce of baker's yeast.

The above compositions are properly compounded and mixed and treated in the same way as ordinary bread dough, particularly as to kneading and permitting the dough to rise, preparatory to baking it. Also the baking operation is similar to the well known method of baking ordinary bread.

The aforesaid proportions are meant to represent the content of the ordinary eigheen-ounce bread loaf. In other words, the above compounds amount to approximately twenty ounces before baking, diminishing in weight during the baking process by two ounces through evaporation of the water contained in the mixture. It is to be noted, however, that the celery content of both mixtures remains unaltered.

To those skilled in the art of baking, it will become readily evident from the foregoing that, due to the employment of my celery extract, a considerably smaller percentage of flour will be required in my formula, than is the case in the production of ordinary bread dough, although the ultimate product will weigh the same as an ordinary eighteen-ounce bread loaf, and will have the same volume. In other words, my formula accomplishes a considerable saving of flour in the production of bread.

In order to preclude any possible misunderstanding, I wish to state that under neutral fats I understand any protein-poor, preferably mineral fats or oils, containing one half percent or less of protein. Under salt I understand common table salt, known as sodium chloride (NaCl). Under baker's yeast I understanding any saccharomycetaceous fungus, which produces fermentation by means of enzyms.

It is well known that during the baking process a crust is formed at the outer surfaces of the loaf, which crust is deprived of the usual water content obtaining in the interior of the bread. Therefore, such crust contains a higher percentage, or greater concentration of all solid ingredients of the dough mixture, and considerably differs from the composition of the interior bread parts. Due to its low carbohydrate and low fat values and its low calorific value, my product is readily suited to form a distinct part of a diet, which may be prescribed by a physician for certain ailments. In such event one of the foremost requirements of the product consists of its uniformity, so as to enable the physician to determine the proper dosage of carbohydrates, proteins, fats and calorific constituents required for specific cases. In order to provide such uniform dosage of the product, I prefer to divide the finished loaf into uniform slices, by first removing the end crusts, containing concentrated ingredients, so that only the inner bread portions (between the removed end crusts) is utilized. Thus uniformly sized pieces of uniform content are obtained.

From the foregoing it will be quite evident that the present invention produces not only a nutritious, but also a palatable baking product, which is not meant to be limited as to its exact percentages of ingredients. Their percentage may be changed and the composition may be altered, if necessary, as long as the product contains as one of its major ingredients the extract of celery, produced in the afore-explained manner. It is quite evident also, that various other fats than those mentioned as neutral or mineral fats may be included in the mixture, as long as such fats possess not more than a small protein percentage and no, or little fat value. I shall, therefore, not be limited to the particular composition and to the percentage of the different ingredients mentioned, and I reserve for myself the right to produce any similar mixture, in which celery extracts are employed, instead of water, within the scope of my invention, as set forth in the annexed claims.

I claim:

1. A dough mixture for producing bakery products, such as bread and the like, of low calorific properties embodying with whole wheat flour and other standard ingredients, an aqueous celery extract, such extract containing all of the ingredients of the celery, excepting the coarse particles, the extract serving as the liquid for the mixture, the amount of the celery extract being approximately seventy-five per cent by weight of the whole wheat flour.

2. The process of preparing a dough mixture for producing bakery products, such as bread and the like of low calorific properties, which consists in adding to a mixture of whole wheat flour and other standard ingredients, an ingredient in the form of a celery extract instead of water, said celery extract being produced by boiling cut up celery and water, and wherein the coarse celery particles are removed leaving only a saturated extract of fine celery particles.

3. The process of preparing a dough mixture for producing bakery products, such as bread and the like of low calorific properties, which consists in adding to a mixture of whole wheat flour and other standard ingredients, an ingredient in the form of a celery extract instead of water, said celery extract being produced by boiling cut up celery and water until approximately one-third of the water has evaporated, and wherein the coarse celery particles are removed leaving only a saturated extract of fine celery particles.

SAM SIEGEL.